Dec. 11, 1945.  L. D. CHRISTIE  2,390,691
MEASURING DEVICE
Filed April 24, 1943  2 Sheets-Sheet 1
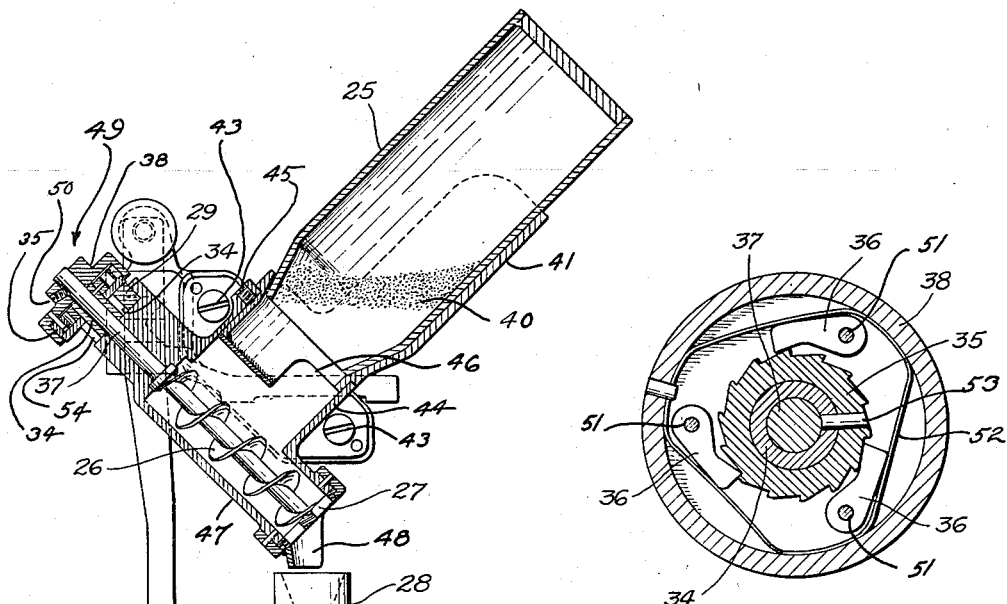
Fig. 3
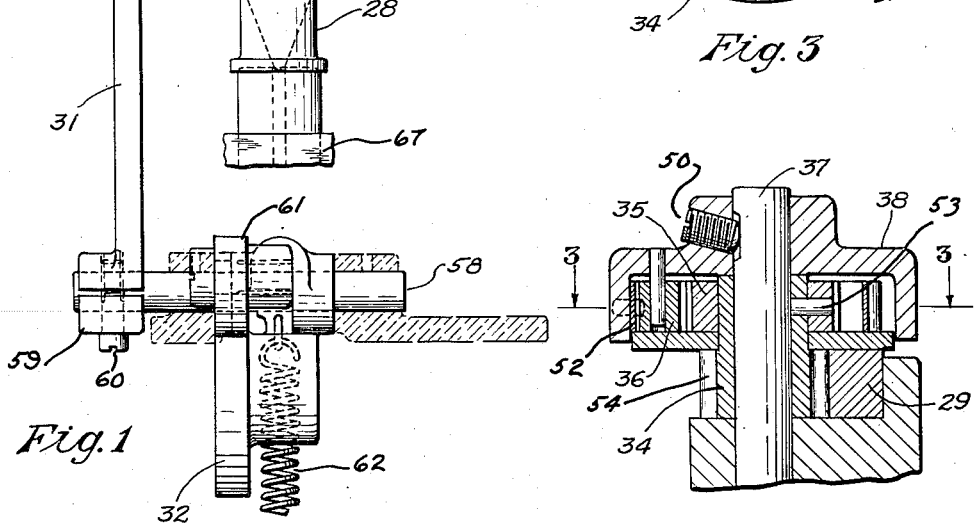
Fig. 1
Fig. 4
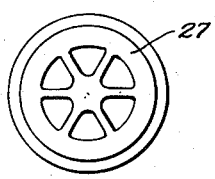
Fig. 5
INVENTOR.
LEWIS D. CHRISTIE
BY
ATTORNEYS.

Dec. 11, 1945.  L. D. CHRISTIE  2,390,691
MEASURING DEVICE
Filed April 24, 1943   2 Sheets-Sheet 2

INVENTOR.
LEWIS D. CHRISTIE
BY
ATTORNEYS.

Patented Dec. 11, 1945

2,390,691

UNITED STATES PATENT OFFICE 2,390,691

MEASURING DEVICE

Lewis D. Christie, Bridgeport, Conn., assignor to Remington Arms Company, Inc., Bridgeport, Conn., a corporation of Delaware Application April 24, 1943, Serial No. 484,407

2 Claims. (Cl. 86—31)

This invention relates to a machine for filling an ammunition component with a freely flowable material and is particularly adapted for use in feeding measured charges of granular material or mixture used in filling tracer or incendiary projectiles of the small arms variety.

Materials of the type mentioned frequently must be measured accurately and fed to a projectile. It is desirable that the quantities exposed be relatively small so as to avoid explosive hazards. The measuring means must be one which eliminates as far as possible all dangers of explosion. The device will be particularly described in its use in charging tracer or incendiary materials, mixtures or compounds to small arms projectiles.

One of the commonly employed methods of measuring and loading such materials is by the use of a scoop dipping into a bag containing the mixture. The scoop is raised out of the mixture and then is carried to a funnel or chute over the projectile. Such a method of loading involves a considerable quantity of very highly inflammable substances with the consequent explosive hazard thereof.

One of the objects of this invention is to eliminate explosive hazard in loading such a mixture. Other objects of the invention will appear from the following description and drawings which are not to be construed as limiting.

Fig. 1 is an end view, partially in section, of the device as applied to a conventional tracer charging machine.

Fig. 3 is a sectional view taken along the line 3—3 of Fig. 4.

Fig. 4 is an enlarged sectional view of the ratchet mechanism.

Fig. 5 is an enlarged view of the discharge spout cover plate.

Figure 2:
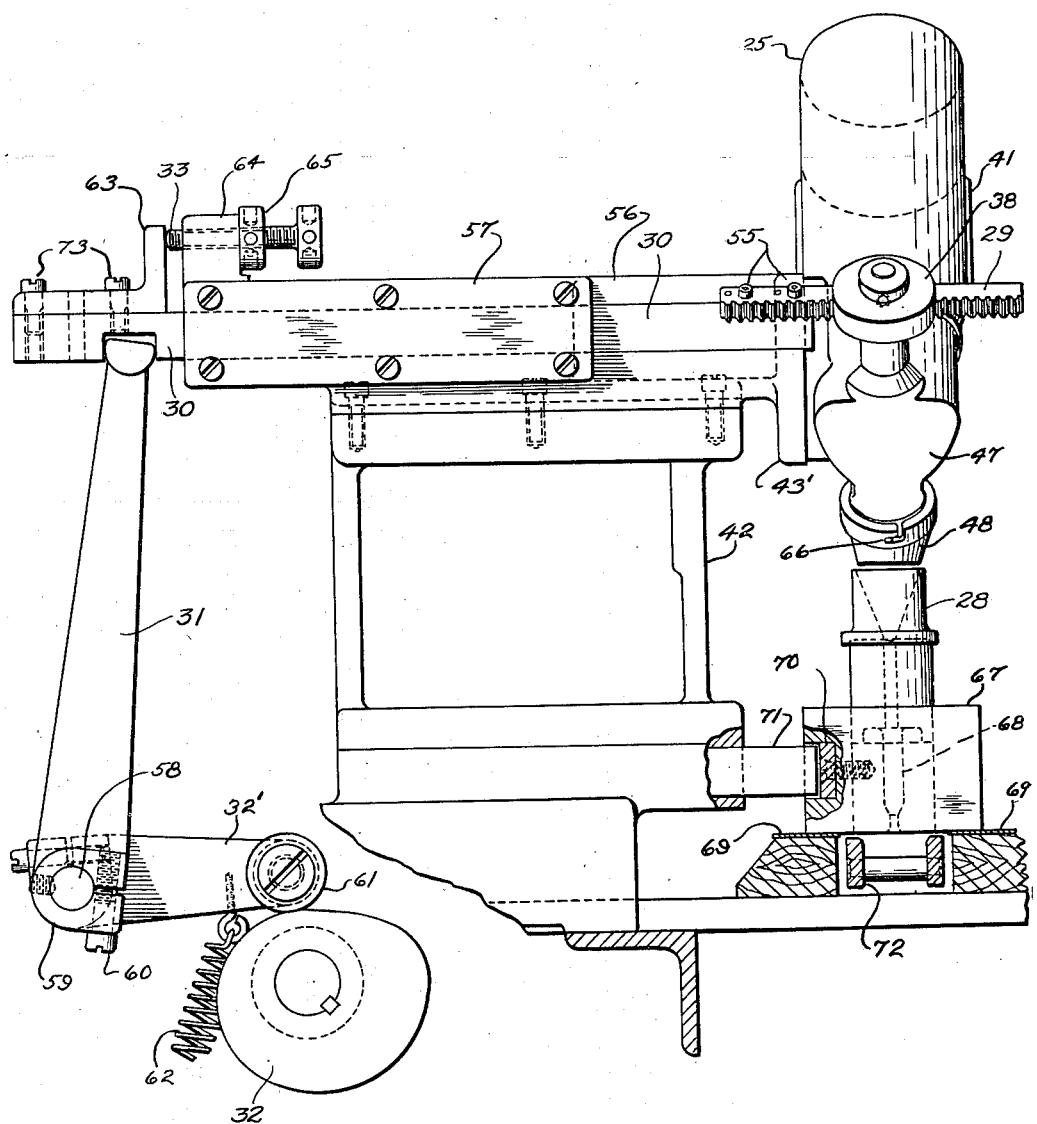
Fig. 2 is a side view of the device shown in Fig. 1.

The present invention employs a worm feeder or helical screw which is intermittently rotated in timed relation with the movement of a projectile underneath the discharge outlet of the worm feeder so as to feed material in a measured amount to said projectile.

Referring to Figs. 1 and 2, one form of reservoir for holding the tracer or incendiary mixture is shown at 25, the mixture being indicated therein at 40. This reservoir may consist of a transparent bottle made of some material such as methyl methacrylate resin although it is obvious that other forms of reservoirs may be used as desired. The reservoir 25 is held in a bracket 41, said bracket 41 being suitably attached to frame 42 of the machine. The bracket 41 can be removably held in bracket holder 44 by means of screw 45. The bracket holder 44 is attached to the frame 43' (Fig. 2) of the machine by means of screws 43. Opening 46 allows communication between the reservoir and the worm feeder 26, the worm feeder 26 being enclosed in casing 47. As the worm feeder is rotated, the flowable material 40 is carried down the worm feeder 26 to discharge screen 27 and discharge chute 48.

The worm feeder is rotated by means of the ratchet mechanism shown generally at 49. The mechanism for operating the ratchet is adjustable, as described hereafter, to impart the movement required to the worm feeder to carry the correct measured quantity of flowable material from the reservoir 25 to the discharge chute 48.

The worm feeder is integral with shaft 37 and cover plate 38 is operatively connected to shaft 37 by means of set screw 50. Pins 51 are fastened to cover plate 38 and oscillatively carry pawls 36. Pawls 36 are engageable with ratchet wheel 35 and are pressed into engagement therewith by means of the band spring 52.

The pawls or the location of the pawl pivots are made such that the operative ends of the pawls are unevenly located relative to the teeth on the ratchet wheel as shown in Fig. 3. The pawls of Fig. 3 are arranged so that while one pawl is in engagement with a tooth, the other two pawls are located ⅓ and ⅔ of the length of a tooth from operative engagement with its corresponding tooth, respectively. In this manner, the ratchet wheel 35 is equivalent to a wheel having three times as many teeth and thus allows a fine adjustment of the amount of material which can be measured by the device. It is evident that more than three pawls unevenly located with respect to the ratchet wheel teeth may be employed.

Ratchet wheel 35 is pinned to sleeve 34 by means of pin 53, sleeve 34 being rotatable relative to shaft 37. A pinion 54 is integral with sleeve 34 and a rack 29 is engageable with said pinion 54. The rack 29 is fastened to slide 30 by means of screws 55. Operating slide 30 is carried in guide 56 and held in place by retaining cover 57.

Slide 30 is reciprocated by means of lever 31 which is attached to shaft 58 by means of the split hub 59 and binding screw 60. Shaft 58 is oscillated by means of arm 32', cam roll 61 and cam 32. The spring 62 has one end connected to arm 32' and the other end connected to the frame of the machine. Cam 32 is thus an open type cam which positively moves arm 32' in a counterclockwise direction (Fig. 2), the spring 62 serving to move arm 32' in a clockwise or return direction. A fixed abutment 63 is fastened to slide 30 by means of screws 73. This fixed abutment contacts adjustable screw 33 to limit the movement of the slide 30 to the right. This is made possible by the open cam arrangement for operating arm 32' inasmuch as the spring 62 causes clockwise movement (Fig. 2) of the arm 31. Adjustable screw 33 is screw threadedly mounted in bracket 64 and has a lock nut 65 located thereon.

The means described above constitutes one of the important safety features of the particular filling device. As has been previously pointed out, this machine is adapted to the handling of materials which may present a considerable explosive hazard. It is of vital importance that such materials be not subjected to severe frictional forces in the event of a clog or jam in the feeding mechanism.

As has been noted, the cam 32 is an open type which can apply positive force to the rack 29 only in a non-feeding direction in which the pawls 36 ride idly over the teeth on the ratchet wheel 35. By proper selection of physical characteristics, a spring 62 can be chosen which will return the rack 29 under any condition of normal operation but will not apply sufficient force to operate the feed under jammed conditions where frictional forces might exceed a safe margin.

If the worm feeder should become clogged, the rack will be retracted to a maximum extent and simply remain in that position until an operator has cleared the stoppage.

The discharge spout 48 may be mounted on casing 47 by means of the bayonet slot arrangement 66. Any type of suitable screen such as that shown at 27 (Fig. 5) may be used or the screen may be omitted.

The projectiles to be filled are carried in a block 67 of any desired type, the projectiles being located in the aperture 68 of the block. The removable apertured funnel 28 serves to carry the flowable material delivered from 48 to a projectile located in aperture 68. The carrier block 67 is moved longitudinally along the machine by means of endless moving belts 69. The carrier block 67 has a notched rack 70 therein which is engageable by a reciprocating locking pawl 71. The locking pawl 71 is reciprocated by means of a cam (not shown) operated in timed relation to cam 32 so as to positively hold a projectile in place under discharge chute 48 as the worm feed is rotated.

If desired, a lifter 72 may be provided to raise the carrier block 67 slightly off the belt 69 at the time the carrier block is held in position under discharge chute 48. The lifter may be omitted.

The carrier block 67 is assembled with the funnel 28 and projectile before the filling station is reached. After the projectile is filled it may be taken to other parts of the machine for application of pressure to the tracer or incendiary composition into the projectile and finally for removal of the projectile from the carrier block.

What is claimed is:

1. A device for filling an ammunition component with measured quantities of a relatively flowable highly combustible material comprising a reservoir for the material; a worm feeder communicating with said reservoir; a ratchet for rotating said worm feeder a predetermined amount; a rack and pinion means for operating said ratchet; an open cam for moving said rack in one direction and a spring for moving said rack in the opposite direction; adjustable means for limiting the movement of the rack in said last mentioned direction; and means directing the discharge of said feeder to an ammunition component.

2. A device for filling a projectile with measured quantities of a relatively flowable material comprising a reservoir for holding flowable highly combustible material for said projectile; a worm feeder communicating with said reservoir; a ratchet for rotating said feeder a predetermined amount; a plurality of pawls for operating said ratchet, said pawls being spaced unevenly relative to said teeth; a rack and pinion for oscillating said pawls; an open cam for positively moving said rack in one direction and a spring for moving said rack in the opposite direction; adjustable means for limiting the movement of the rack in said last mentioned direction; and means to direct the discharge of said feeder to a projectile.

LEWIS D. CHRISTIE.